(12) United States Patent
Dvash

(10) Patent No.: US 9,414,466 B2
(45) Date of Patent: Aug. 9, 2016

(54) CONFIGURABLE AND REMOTLY CONTROLLED BULB ADAPTOR

(71) Applicant: Activocal Ltd., Yavne (IL)

(72) Inventor: Nir Dvash, Aniam (IL)

(73) Assignee: ACTIVOCAL LTD., Yavne (IL)

( * ) Notice: Subject to any disclaimer, the term of this patent is extended or adjusted under 35 U.S.C. 154(b) by 0 days.

(21) Appl. No.: 14/741,483

(22) Filed: Jun. 17, 2015

(65) Prior Publication Data

US 2015/0366037 A1    Dec. 17, 2015

Related U.S. Application Data

(63) Continuation-in-part of application No. PCT/IL2013/050718, filed on Aug. 26, 2013.

(60) Provisional application No. 61/815,298, filed on Apr. 24, 2013, provisional application No. 61/816,826, filed on Apr. 29, 2013, provisional application No. 62/026,607, filed on Jul. 19, 2014.

(51) Int. Cl.
*H01J 7/44* (2006.01)
*H05B 37/02* (2006.01)
*H01H 35/00* (2006.01)
*H01R 33/945* (2006.01)

(52) U.S. Cl.
CPC ........... *H05B 37/0236* (2013.01); *H01H 35/00* (2013.01); *H01R 33/9453* (2013.01)

(58) Field of Classification Search
CPC .................................................. H05B 37/0236
USPC ...................................... 340/815.46; 704/275
See application file for complete search history.

(56) References Cited

U.S. PATENT DOCUMENTS

| 4,630,248 A * | 12/1986 | Scott ...................... G08B 7/062 307/117 |
| 7,031,920 B2 * | 4/2006 | Dowling ............ H05B 37/0236 704/270 |
| 7,370,991 B1 * | 5/2008 | Ellis-Fant ................. F21L 4/04 362/105 |
| 8,853,950 B1 * | 10/2014 | Chang .................... H05B 37/02 315/119 |
| 2002/0044066 A1 | 4/2002 | Dowling |
| 2004/0148174 A1 | 7/2004 | Ullman |
| 2004/0264187 A1 | 12/2004 | Vanderschuit |
| 2006/0178888 A1 * | 8/2006 | Lewis ..................... G10L 15/26 704/275 |
| 2008/0262849 A1 | 10/2008 | Buck |
| 2010/0103664 A1 * | 4/2010 | Simon ..................... F21K 9/135 362/234 |
| 2013/0308315 A1 * | 11/2013 | Capitani ................... F21K 9/13 362/253 |
| 2014/0042909 A1 * | 2/2014 | Chan .................. H05B 33/0803 315/127 |
| 2014/0049971 A1 * | 2/2014 | McGuire ............... F21V 23/003 362/382 |

FOREIGN PATENT DOCUMENTS

WO    WO2012148383    11/2012

* cited by examiner

*Primary Examiner* — Jason M Crawford
(74) *Attorney, Agent, or Firm* — Reches Patents

(57) ABSTRACT

A bulb adaptor that may include a housing that comprises an input adaptor and an output adaptor; wherein the input adaptor is shaped and sized to match a bulb socket and wherein the output adaptor is shaped and sized to match a base of a bulb; and circuitry, located within the housing, that is electrically coupled between the input adaptor and the output adaptor and is arranged to control a provision of electricity from the input adaptor to the output adaptor in response to a reception of sound waves are associated with a command to be executed by the circuitry.

27 Claims, 10 Drawing Sheets

CONFIGURABLE AND REMOTLY CONTROLLED BULB ADAPTOR

RELATED APPLICATIONS

This application is a continuation in part of PCT patent application PCT/IL2013/050718 filing date Aug. 26 2013, that in turn claims priority from U.S. provisional patent Ser. No. 61/815,298 filing date Apr. 24, 2013, and of U.S. provisional patent Ser. No. 61/816,826 filing date Apr. 29, 2013; this application also claims priority from U.S. provisional patent Ser. No. 62/026,607 filed Jul. 19, 2014, all applications being incorporated herein in their entirety.

BACKGROUND OF THE INVENTION

Voice activated bulbs include dedicated control circuits that are embedded in the bulb. The inclusion of the dedicated control circuits increases the cost of such bulbs. Furthermore—at the end of the life span of the bulb the dedicated control circuits is thrown away.

There is a growing need to provide an efficient solution for remotely controlling bulbs, especially when using so called "normal" or "dumb" bulbs that do not include dedicated control circuitry.

SUMMARY

According to an embodiment of the invention there is provided a bulb adaptor. The bulb adaptor may include a housing and circuitry. The housing may include an input adaptor and an output adaptor. The input adaptor is shaped and sized to match a bulb socket and wherein the output adaptor is shaped and sized to match a base of a bulb. The circuitry is located within the housing and is electrically coupled between the input adaptor and the output adaptor. The circuitry is arranged to control a provision of electricity from the input adaptor to the output adaptor in response to a reception of sound waves that represent a command to be executed by the circuitry.

The predefined parameters may include frequency, amplitude characteristics, phase characteristics, vocal content and the like.

The circuitry may be arranged to search for ultrasonic sound waves that represent a command of a first set of commands and to search for human perceptible sound waves (within the frequency range of about 20 to 20000 Hertz) that represent a command of a second set of command.

The first set of commands may equal the second set of commands. Thus—the same commands can be sent using ultrasonic sound waves or using human perceivable sound waves.

The first set of commands may differ from the second set of commands. Thus—at least one command can be sent using only one out of ultrasonic sound waves or human perceivable sound waves.

The first set of commands may include more or less commands than the second set of commands.

The first set of commands may include at least one command that is more complex than each command of the second set of commands. This may simplify the speech recognition process that will be aimed to detect simpler instructions (such as turn on and turn off), and may also reduce the cost and/or increase the robustness of the speech recognition process.

For example, the second set of commands may consist of commands that do not exceed two words (such as turn on, turn off, reduce intensity or increase intensity). Yet for another example the first set of commands may include commands that do not exceed two words (such as turn on, turn off, reduce intensity or increase intensity).

The second set of commands consists of commands that consist of a bulb adaptor identifier and up to two additional words. Each bulb adaptor can be associated with a bulb adaptor identifier and the circuitry may be arranged to ignore any command of the second set of commands that does not may include a bulb adaptor identifier that matches a bulb adaptor identifier associated with the bulb adaptor. The bulb adaptor identifier can be programmed in advance (for example—during the manufacturing of the bulb adaptor) but may, additionally or alternatively, be set by a device that controls the bulb adaptor. Yet for another example the first set of commands may include commands that consist of a bulb adaptor identifier and up to two additional words The first set of commands may include at least one command that lacks a bulb identifier and wherein the circuitry may be arranged to respond to the at least one command that lacks the bulb identifier. Thus—a device may send a "general" command to a group of bulb adaptors in order to control the group of bulb adaptors—without the need of sending a separate command to each bulb adaptor. The second set of commands may also include at least one command that lacks a bulb identifier.

The second set of commands may consist of a turn on command and a turn off command.

The first set of commands may include a turn on command, a turn off command, at least one time related command, and a dimmer command. The time related command can indicate when to activate or deactivate a bulb, can indicate how do activate the bulb (for example—apply on/off and even dimmer commands) during different periods and the like.

The first set of commands may include a circuit configuration command. This circuit configuration command may, for example, assign a bulb adaptor identifier to the bulb adaptor, sending a set of instructions to be included in the first and/or second sets of commands.

The circuitry may be arranged to apply a signature seeking process on ultrasonic sound waves received by the circuitry to search for one or more commands. Commands may be represented by ultrasonic sound waves—each ultrasonic sound wave may have a signature that identifies it. The signature seeking process searches for these signatures—for example by extracting signatures from received ultrasonic sound waves and comparing them to previously stored signatures or otherwise determined if the extracted signature fulfill other conditions (such as a compliance with a predefined mathematical formula).

The circuitry may be arranged to apply a speech recognition process to human perceptible sound waves to detect one or more commands. Commands may be represented by human perceivable sound words—that can be identified by speech recognition processes.

According to an embodiment of the invention the circuitry may include a microphone; a controller; an interfacing circuit and a power converter. The controller is coupled to the microphone and to the interfacing circuit and is fed by the power converter. The power converter is arranged to receive electricity supplied from the input adaptor and to output a controller power supply.

The interfacing circuit is coupled to the input and output adaptors. The microphone may be arranged to sense sound signals including human perceivable sound waves and ultrasonic sound waves. The interfacing circuit may be arranged to selectively provide the electricity from the input adaptor to the output adaptor under the control of the controller. The controller may be arranged to control the interfacing circuit in response to at least a detection of sound signals that represent a command such as a detection of an ultrasonic sound wave command and a human perceivable sound wave command.

The bulb adaptor may include a memory unit for storing representations of multiple commands (signatures). The controller may be arranged to compare sound signals to the representations of the multiple commands.

The input adaptor may differ by diameter from the output adaptor. Thus is can bridge between a gap between a diameter of a base of a light bulb and a diameter of the light bulb socket.

The housing may exhibits a radial symmetry.

The input adaptor and the output adaptor may be Edison adaptors of other types of adaptors (such as a bayonet mount adaptors, a bi-pin adaptors and the like).

The input adaptor and the output adaptor may be threaded.

The input adaptor may differ by diameter from the output adaptor.

The height of the housing may be smaller than one half of a width of the housing.

The height of the housing may be smaller than one third of a width of the housing.

The height housing may be smaller than ten centimeters.

The input adaptor and the output adaptor may be Edison adaptors and may even be Edison E-27 adaptors.

A method for controlling a provision of electricity to a bulb, the method may include receiving, by circuitry that is electrically coupled between an input adaptor and an output adaptor, sound signals; determining whether the sound signals represent a command to be executed by the circuitry; and controlling, by the circuitry, a provision of electricity from the input adaptor to the output adaptor in response to a detection of the command; wherein the circuitry is at least partially surrounded by a housing that may include the input adaptor and the output adaptor; wherein the input adaptor is shaped and sized to match a bulb socket and wherein the output adaptor is shaped and sized to match a base of a bulb.

According to an embodiment of the invention if a user wishes, he/she can change a default trigger (sound signals associated with a command) with another (personal) trigger of their choice. This process is done via a smart device such as a phone, tablet or PC in which, using a special software, the user trains the new trigger. The software will then process the trigger and wirelessly transfer the data of the trigger to the adaptor where it will be stored in a non-volatile memory to be used as the new trigger. This process can be repeated endlessly.

The bulb attached to this adaptor will continue to function normally using the light switch.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
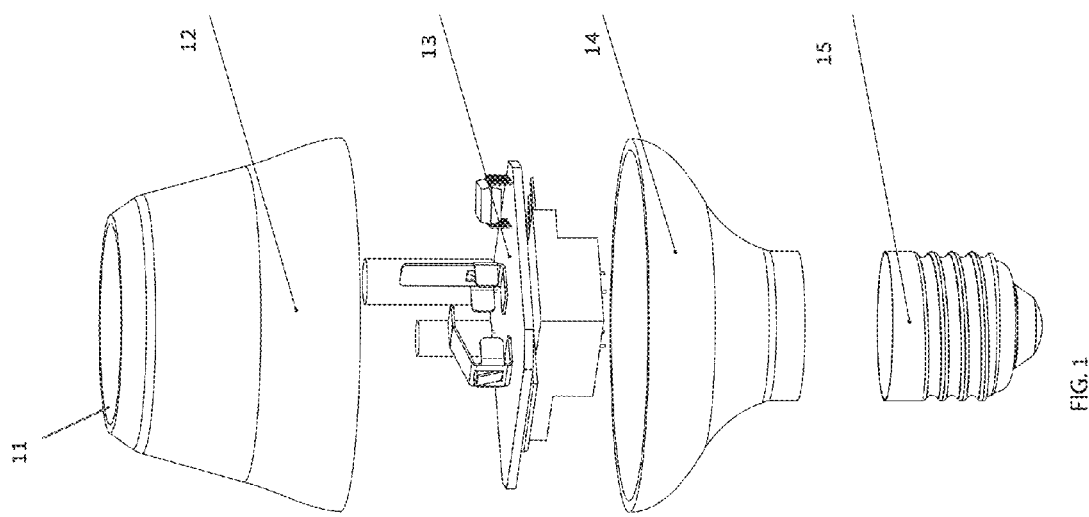
FIG. 1 is an exploded view of a bulb adaptor according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Bulb Adaptor Mechanics and Circuitry

Figure 3:
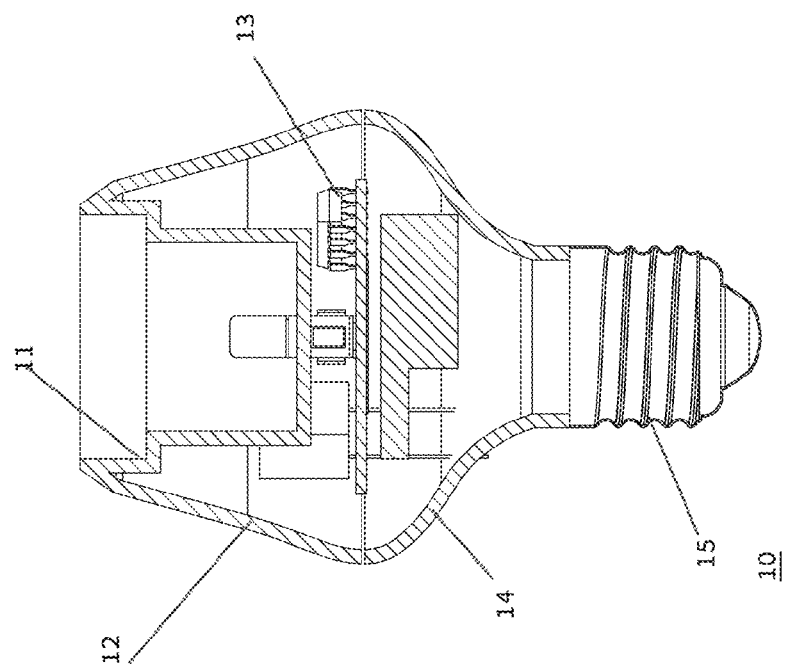
FIG. 3 is a cross sectional view of a bulb adaptor according to an embodiment of the invention.
Figure 2:
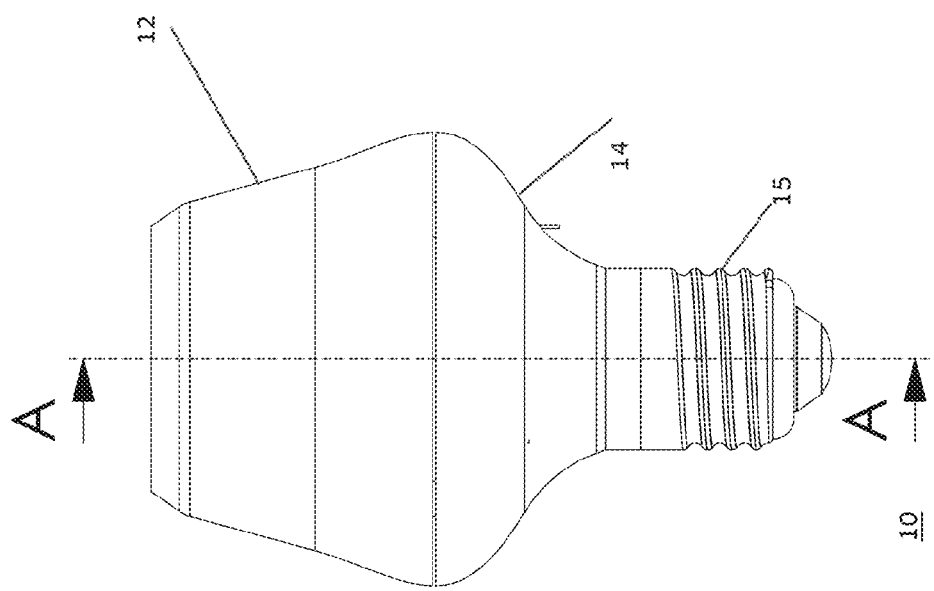
FIG. 2 is a side view of a bulb adaptor according to an embodiment of the invention.
Figure 9:
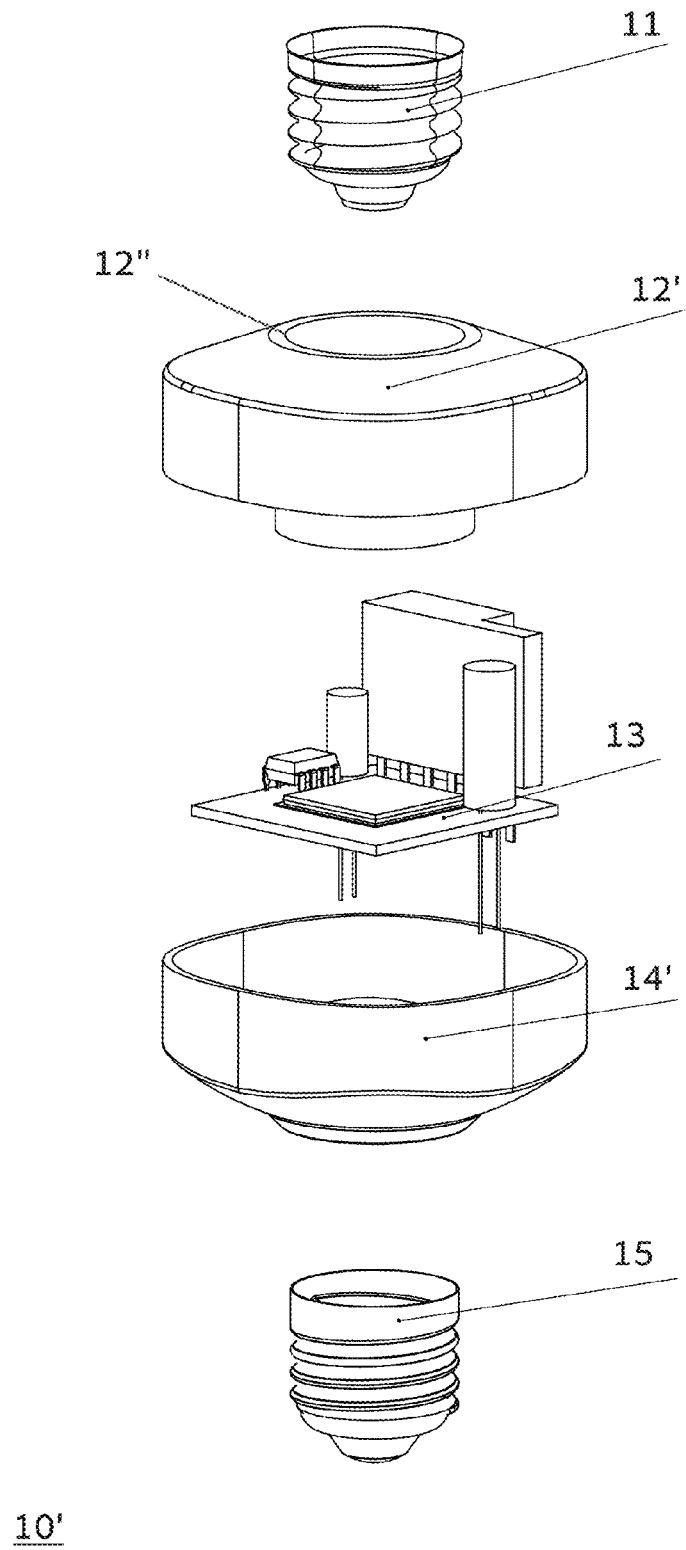
FIG. 9 is an exploded view of a bulb adaptor according to an embodiment of the invention.

FIG. 1 is an exploded view of a bulb adaptor 10 according to an embodiment of the invention. FIG. 9 is an exploded view of bulk adaptor 10' according to an embodiment of the invention. FIG. 3 is a cross sectional view of a bulb adaptor 10 according to an embodiment of the invention. FIG. 2 is a side view of a bulb adaptor 10 according to an embodiment of the invention.

According to an embodiment of the invention there is provided a bulb adaptor. The bulb adaptor may include a housing and circuitry. The housing may include an input adaptor and an output adaptor. The input adaptor is shaped and sized to match a bulb socket and wherein the output adaptor is shaped and sized to match a base of a bulb. The circuitry is located within the housing and is electrically coupled between the input adaptor and the output adaptor. The circuitry is arranged to control a provision of electricity from the input adaptor to the output adaptor in response to a reception of sound waves that represent a command to be executed by the circuitry.

The term "command" refers to request, instruction, or any type of information that may affect the operation of the circuitry—and especially may affect the operations of the interfacing circuit.

FIGS. 1, 2, 3 and 9 provide examples of various embodiments. Bulb adaptor 10' differs from bulb adaptor 10 by the shape of its housing.

The exploded view of FIG. 1 and the cross sectional view of FIG. 3 illustrate the following components—starting from the highest component to the lowest component:

a. Output adaptor—such as threaded female adaptor 11;
b. Top part 12 of a housing.
c. Circuitry 13.
d. Bottom part 14 of housing.
e. Input adaptor—such as threaded male adaptor 15.

The exploded view of FIG. 9 illustrates the following components—starting from the highest component to the lowest component:

a. Output adaptor—such as threaded female adaptor 11;
b. Top part 12' of a housing.
c. Circuitry 13.
d. Bottom part 14' of housing.
e. Input adaptor—such as threaded male adaptor 15.

Referring to FIGS. 1-3 and 9—the threaded female adaptor 11 should be positioned within the top part 12 of the housing—it may be located within a space defined by the circular opening 12" (of FIG. 9) formed at the top part 12' (of FIG. 9) of the housing 10'. The upper rim can be proximate to the circular opening 12"—either at the same level, slightly (for example few millimeters) above it or slightly below it. FIG. 2 illustrates a side view of the bulb adaptor 10—illustrating top part 12 of the housing, bottom part of the housing 14 and the input adaptor 15.

In FIGS. 1-3 and 9 the input adaptor 15 and output adaptor 11 may virtually fit to each other—if one of these adaptors is disconnected from the bulb adaptor it can be fit the other adaptor—the input adaptor can be screwed in the output adaptor.

This is not necessarily so and the input adaptor 15 and output adaptor 11 may not virtually fit to each other. This configuration can be useful if the bulb adaptor is to be connected between a bulb and a bulb socket that do not match each other. For example—the input adaptor 15 may differ by diameter from the output adaptor 11. Thus is can bridge a gap between a diameter of a base of a light bulb and a diameter of the light bulb socket.

The housing may exhibits a radial symmetry.

The input adaptor and the output adaptor may be Edison adaptors or other types of adaptors (such as a bayonet mount adaptors, a bi-pin adaptors and the like).

The input adaptor and the output adaptor may be threaded (as illustrated in FIG. 1).

The height of the housing may be a fraction (for example, smaller than one half, one third of one quarter) of a width of the housing.

Figure 4:
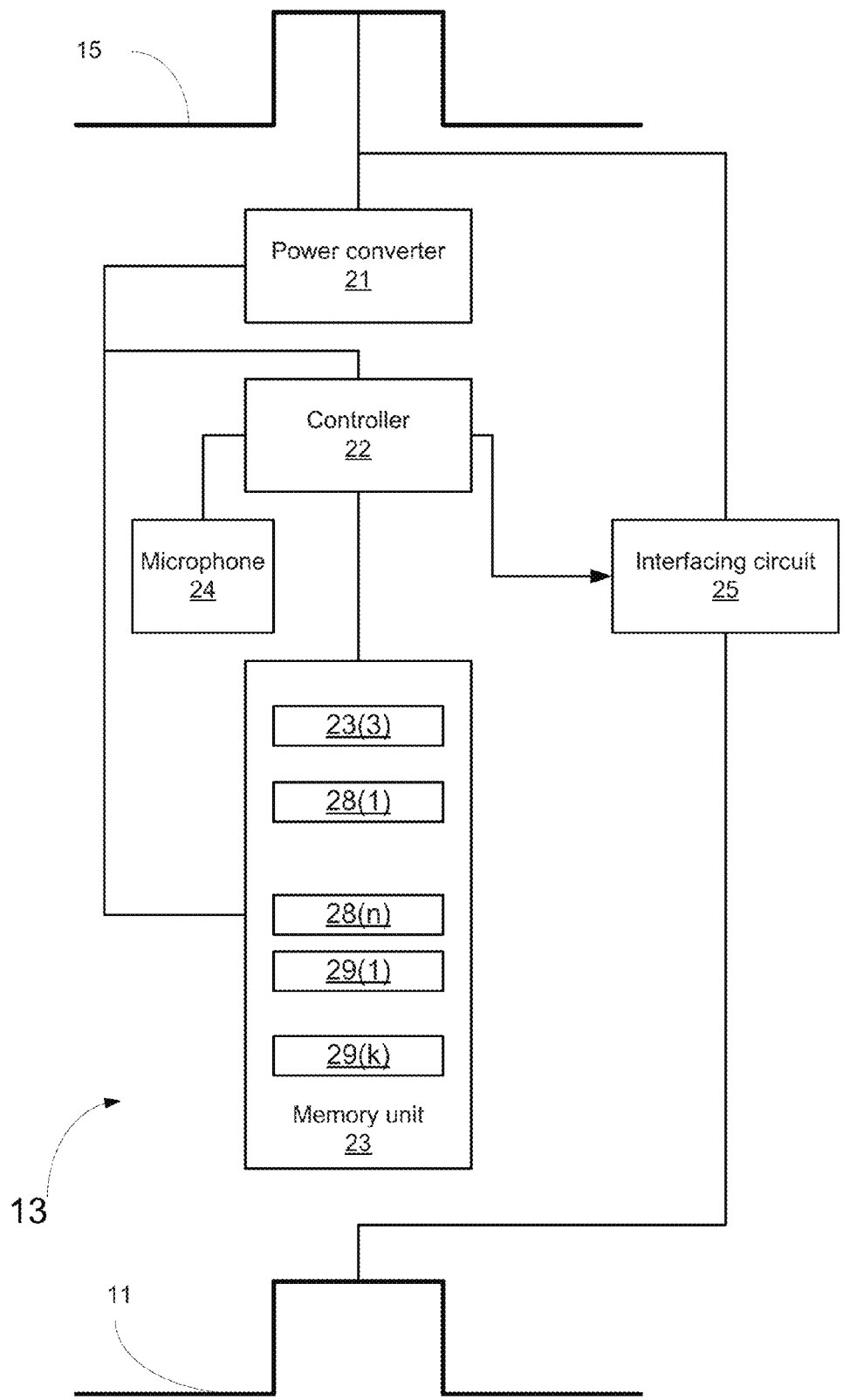
FIG. 4 illustrates the circuitry of the bulb adaptor according to an embodiment of the invention.

FIG. 4 illustrates the circuitry 13 of the bulb adaptor and its environment according to an embodiment of the invention.

Referring to the example set forth in FIG. 4—circuitry 13 may include a microphone 24, a controller (such as a microprocessor) 22, an interfacing circuit 25 (such as load switch) and a power converter 21 (such as an AC to DC converter). The controller 22 may include an internal memory unit but may be, additionally or alternatively, coupled to memory unit 24. The controller 22 is coupled to the microphone 24 and to the interfacing circuit 25 and is fed by the power converter 21. The power converter 21 may be an AC to DC converter that is arranged to receive electricity supplied from the input adaptor 15 and to output a controller power supply.

The interfacing circuit 25 is coupled to the input and output adaptors 15 and 11. The microphone 24 may be arranged to sense sound signals including human perceivable sound waves and ultrasonic sound waves. The interfacing circuit 25 may be arranged to selectively provide the electricity from the input adaptor to the output adaptor under the control of the controller 22. The controller 22 may be arranged to control the interfacing circuit 25 in response to at least a detection of sound signals that represent a command such as a detection of an ultrasonic sound wave command and a human perceivable sound wave command.

FIG. 4 illustrates the memory unit 23 as storing representations of multiple commands (signatures)—signatures 28(1)-28(n) of multiple (n) human perceivable sound wave commands and signature 29(1)-29(k) of multiple (n) ultrasonic sound wave commands. The controller 22 may be arranged to compare sound signals to the representations of the multiple commands.

Ultrasonic Sound Waves and Human Perceivable Sound Wave Control Based Scheme

The circuitry 13 may be arranged to search for ultrasonic sound waves that represent a command of a first set of commands and to search for human perceptible sound waves with a command of a second set of command.

The first set of commands may equal the second set of commands. Thus—the same commands can be sent using ultrasonic sound waves or using human perceivable sound waves.

The first set of commands may differ from the second set of commands. Thus—at least one command can be sent using only one out of ultrasonic sound waves or human perceivable sound waves.

The first set of commands may include more or less commands than the second set of commands.

The first set of commands may include at least one command that is more complex than each command of the second set of commands. This may simplify the speech recognition process that will be aimed to detect simpler instructions (such as turn on and turn off), and may also reduce the cost and/or increase the robustness of the speech recognition process.

For example, the second set of commands may consist of commands that do not exceed two words (such as turn on, turn off, reduce intensity or increase intensity):

| First word | Optional second word |
| --- | --- |

The second set of commands may consist of commands that consist of a bulb adaptor identifier and up to two additional words:

| Bulb adaptor identifier | Additional word | Optional additional word |
| --- | --- | --- |

Each bulb adaptor can be associated with a bulb adaptor identifier and the circuitry may be arranged to ignore any command of the second set of commands that does not may include a bulb adaptor identifier that matches a bulb adaptor identifier associated with the bulb adaptor. The bulb adaptor identifier can be programmed in advance (for example— during the manufacturing of the bulb adaptor) but may, additionally or alternatively, be set by a device that controls the bulb adaptor.

The first set of commands may include at least one command that lacks a bulb identifier and wherein the circuitry may be arranged to respond to at least one command that lacks the bulb identifier. Thus—a device may send a "general" command to a group of bulb adaptors in order to control the group of bulb adaptors—without the need of sending a separate command to each bulb adaptor.

The second set of commands may consist of a turn on command and a turn off command.

The first set of commands may include a turn on command, a turn off command, at least one time related command, and a dimmer command. The time related command can indicate when to activate or deactivate a bulb, can indicate how do activate the bulb (for example—apply on/off and even dimmer commands) during different periods and the like.

The first set of commands may include a circuit configuration command. This circuit configuration command may, for example, assigning a bulb adaptor identifier to the bulb adaptor, sending a set of instructions to be included in the first and/or second sets of commands.

The circuitry may be arranged to apply a signature seeking process on ultrasonic sound waves received by the circuitry to search for one or more command. Commands may be represented by ultrasonic sound waves—each ultrasonic sound wave may have a signature (for example—signatures 28(1)-28(n)) that identifies is. The signature seeking process searches for these signatures—for example by extracting signatures from receive ultrasonic sound waves and comparing them to previously stored signatures or otherwise determined if the extracted signature fulfill other conditions (such as a compliance with a predefined mathematical formula).

The circuitry may be arranged to apply a speech recognition process to human perceptible sound waves to detect one or more command. Commands may be represented by human perceivable sound words (identified by signatures such as signatures 29(1)-29(k) of FIG. 3)—that can be identified by speech recognition processes.

Figure 5:
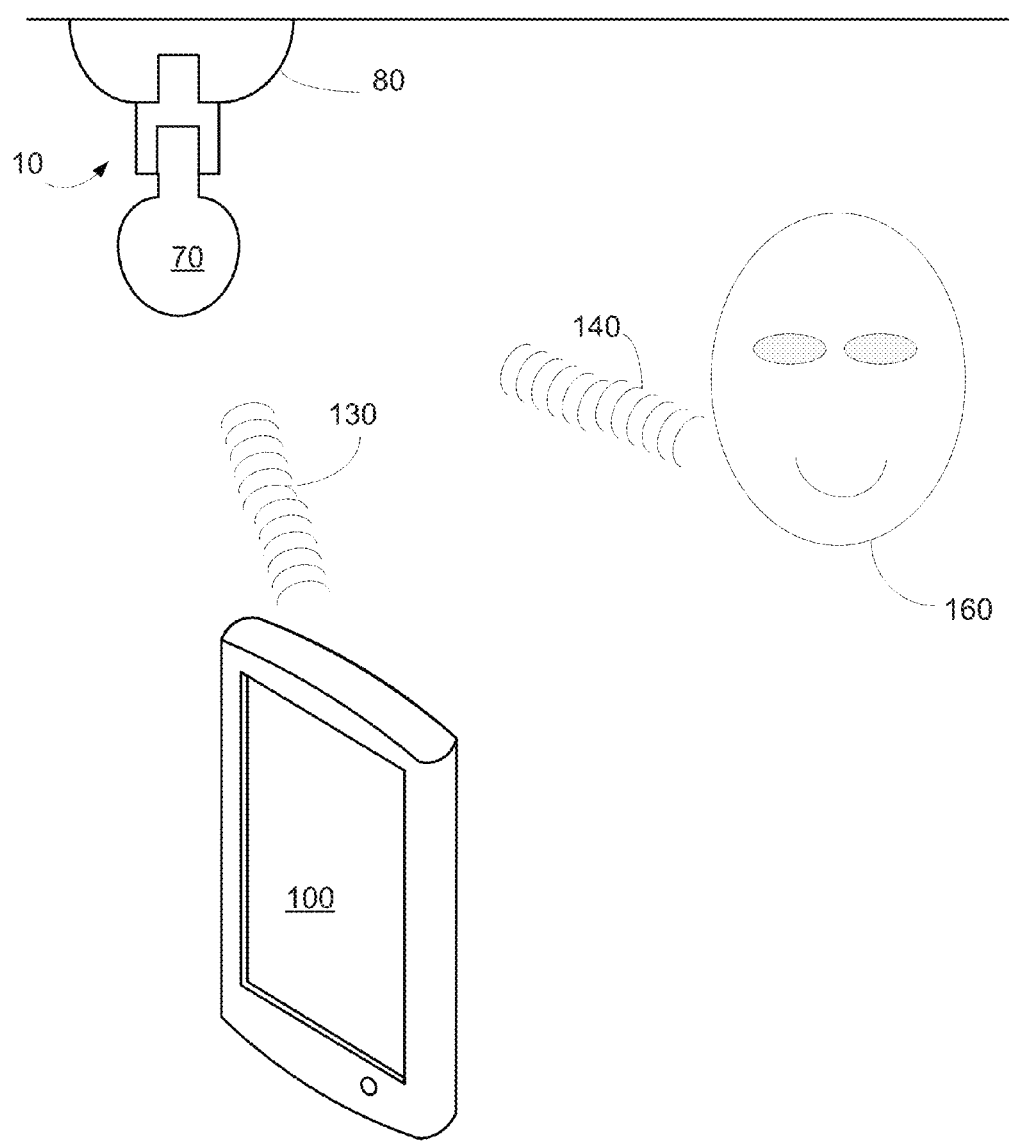
FIG. 5 illustrates a device that remotely controls the bulb adaptor, the bulb adaptor and ultrasonic tokens sent from the device to the bulb adaptor according to an embodiment of the invention.

FIG. 5 illustrates a device 100 that remotely controls the bulb adaptor, the bulb adaptor 10, bulb 70, ceiling connected element that includes a bulb socket, and ultrasonic sound waves 130 that represent commands that are sent from the device 100 to the bulb adaptor 10 according to an embodiment of the invention. The bulb adaptor 10 may also receive human perceivable sound waves 140 from the device 100 or from a user 160.

The device 100 can be a smartphone, a laptop computer, a game console or any device that can transmit ultrasonic sound waves and may include an interface for allowing a user to control the transmission of commands from the device.

The ultrasonic sound waves can include tokens 130 that can represent commands of the first set of commands. The device 100 can also send human perceivable sound waves that represent commands of the second set of commands.

The device can allows a user to send commands aimed to one or more bulb adaptors that are within the range of the device. The user can select, for example, to control multiple bulb adaptors at once. For example—shut down, power up, set an intensity of, perform a time related operation relating to bulbs connected to all of the bulb adaptors within the range of the device.

Figure 8:
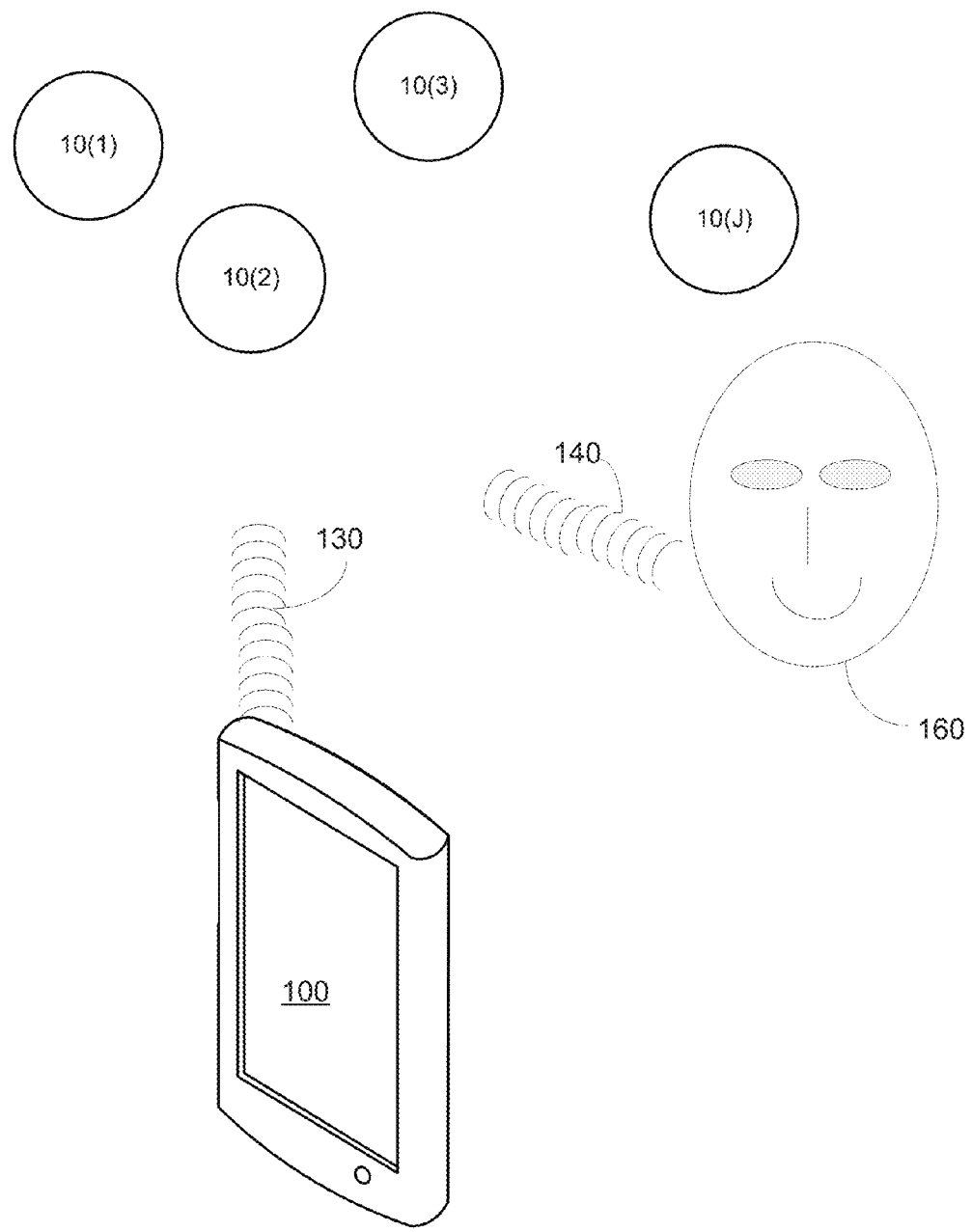
FIG. 8 illustrates a device that remotely controls an array of multiple (J) bulb adaptors, and ultrasonic sound waves that represent commands that are sent from the device to the bulb adaptors according to an embodiment of the invention.

FIG. 8 illustrates a device 100 that remotely controls an array of multiple (J) bulb adaptors 10(1)-10(J), and ultrasonic sound waves 130 that represent commands that are sent from the device 100 to the bulb adaptors according to an embodiment of the invention. These bulb adaptors may also be controlled by human perceived sound waves 140.

Remote Control Device

Figure 6:
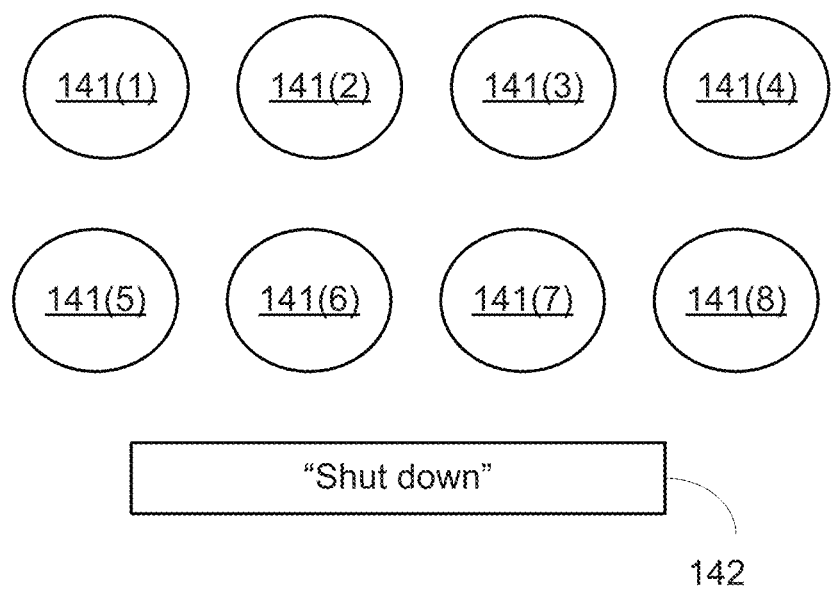
FIG. 6 illustrates a screen shot of a device that remotely controls the bulb adaptor according to an embodiment of the invention.

FIG. 6 illustrates a screenshot of a screen 150 of a device 100 that remotely controls the bulb adaptor 10 according to an embodiment of the invention.

The device 100 has a human interface such as a screen 150 that can be used to display information to the user. One of these screens may display to the user one or more bulb adaptors that are within the range of the device and/or can be potentially controlled by the device 100 and allow the user to control one, all of a part of the bulb adaptors.

The screenshot 150 shows eight icons 151(1)-151(8) and a command window 152. The eight icons 151(1)-151(8) that represent up to eight bulb adaptors that can be controlled by the device 100, these icons 151(1)-151(8) can be elected by the user that can apply a command (for example—"shut down") listed within the command window 152 on any of these eight bulb adaptors.

Figure 7:
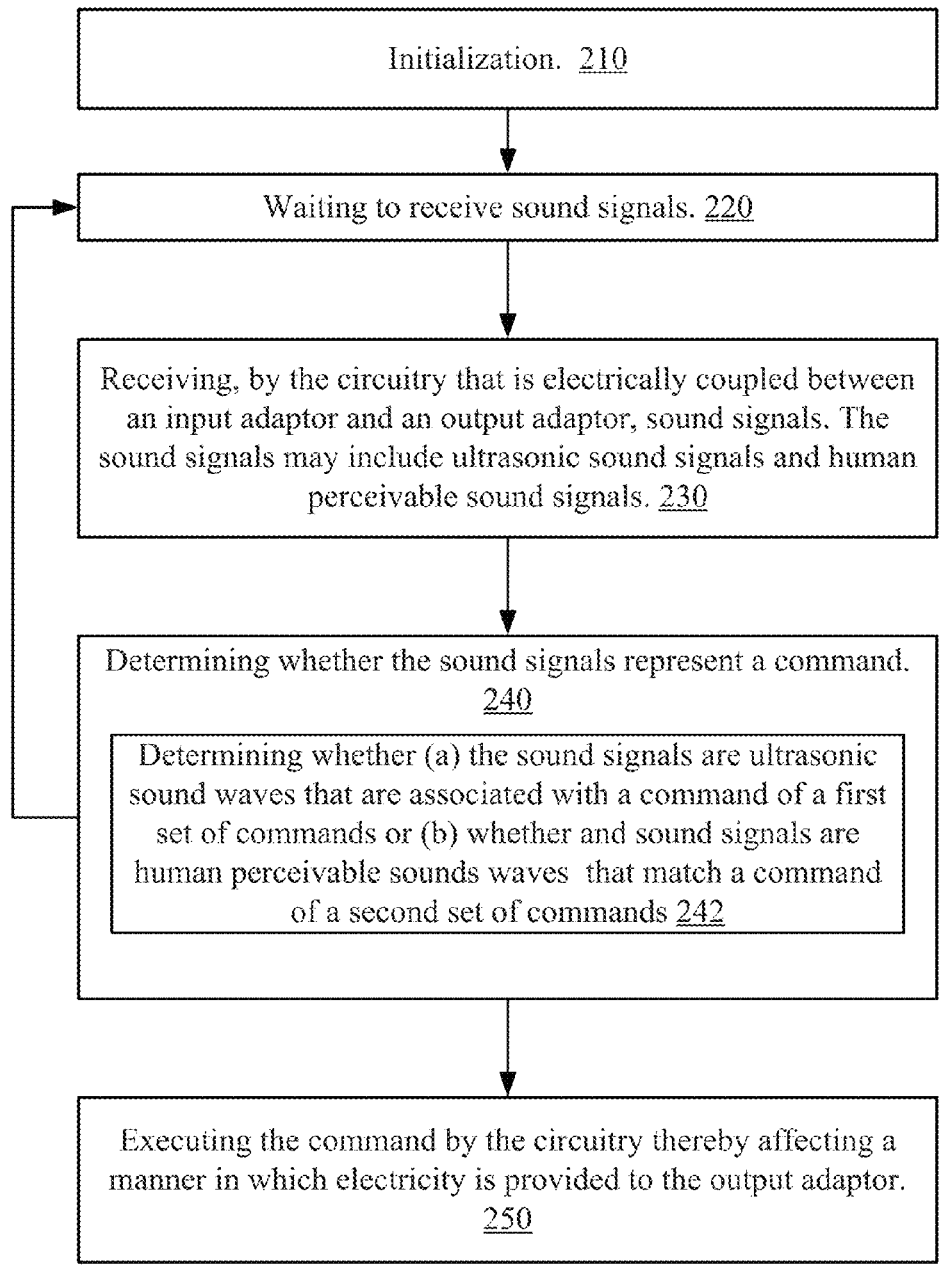
FIG. 7 illustrates a method according to an embodiment of the invention.

FIG. 7 illustrates method 200 according to an embodiment of the invention.

Method 200 is for controlling a provision of electricity to a bulb.

The method may start by stage 210 of initialization. The initialization may include configuring the bulb adaptor—for example sending one or more configurations command to a circuitry. This may include assigning a bulb adaptor identifier to the bulb adaptor, sending a set of instructions to be included in the first and/or second sets of commands.

Stage 210 may be followed by stage 220 of waiting to receive sound signals.

Stage 220 is followed by stage 230 of receiving, by the circuitry that is electrically coupled between an input adaptor and an output adaptor, sound signals. The sound signals may include ultrasonic sound signals and human perceivable sound signals.

Stage 230 may be followed by stage 240 of determining whether the sound signals represent a command.

If yes—jumping to stage 250 of executing the command by the circuitry. Else—jumping to stage 220.

The execution of stage 210-250 results in controlling, by the circuitry, the provision of electricity from the input adaptor to the output adaptor.

Stage 240 may include determining whether (a) the sound signals are ultrasonic sound waves that are associated with a command of a first set of commands or (b) whether and sound signals are human perceivable sounds waves that match a command of a second set of commands.

If both (a) and (b) fail (no match to any command of the first and second sets of commands) then stage 240 is followed by stage 220.

Each set of commands may include one or more commands.

The first set of commands may equal the second set of commands. Thus—the same commands can be sent using ultrasonic sound waves or using human perceivable sound waves.

The first set of commands may differ from the second set of commands. Thus—at least one command can be sent using only one out of ultrasonic sound waves or human perceivable sound waves.

The first set of commands may include more or less commands than the second set of commands.

The first set of commands may include at least one command that is more complex than each command of the second set of commands. This may simplify the speech recognition process that will be aimed to detect simpler instructions (such as turn on and turn off), and may also reduce the cost and/or increase the robustness of the speech recognition process.

For example, the second set of commands may consist of commands that do not exceed two words (such as turn on, turn off, reduce intensity or increase intensity).

The second set of commands consists of commands that consist of a bulb adaptor identifier and up to two additional words.

Each bulb adaptor can be associated with a bulb adaptor identifier.

Stage 240 may also include checking if the bulb adaptor that executes method 200 should execute the command.
 a. If the execution of the command requires a match between the bulb adaptor identifier included in the command and the bulb adaptor identifier of the bulb adaptor itself then a mismatch can cause the method to proceed to stage 220. If there is a match between these bulb adaptor identifiers that the command can be executed.
 b. If the execution of the command does not require a match between the bulb adaptor identifier included in the command (of such exists) and the bulb adaptor identifier of the bulb adaptor itself then even mismatch will not cause the method to proceed to stage 220 before completing the execution of the command.

The first set of commands may include at least one command that lacks a bulb identifier and stage 240 may include responding to the at least one command that lacks the bulb identifier. Thus—a device may send a "general" command to a group of bulb adaptors in order to control the group of bulb adaptors—without the need of sending a separate command to each bulb adaptor.

The second set of commands may consist of a turn on command and a turn off command.

The first set of commands may include a turn on command, a turn off command, at least one time related command, and a dimmer command. The time related command can indicate when to activate or deactivate a bulb, can indicate how do activate the bulb (for example—apply on/off and even dimmer commands) during different periods and the like.

The first set of commands may include a circuit configuration command. This circuit configuration command may, for example, assigning a bulb adaptor identifier to the bulb adaptor, sending a set of instructions to be included in the first and/or second sets of commands.

Stage 240 may include applying a signature seeking process on ultrasonic sound waves received by the circuitry to search for one or more command. Commands may be represented by ultrasonic sound waves—each ultrasonic sound wave may have a signature (for example—signatures 28(1)-28(n)) that identifies is. The signature seeking process searches for these signatures—for example by extracting signatures from receive ultrasonic sound waves and comparing them to previously stored signatures or otherwise determined if the extracted signature fulfill other conditions (such as a compliance with a predefined mathematical formula).

Stage 240 may include applying a speech recognition process to human perceptible sound waves to detect one or more command. Commands may be represented by human perceivable sound words (identified by signatures such as signatures 29(1)-29(k) of FIG. 3)—that can be identified by speech recognition processes.

Method 200 can be executed by any bulb adaptors illustrated in the specification.

Bulb Embodiment

Figure 10:
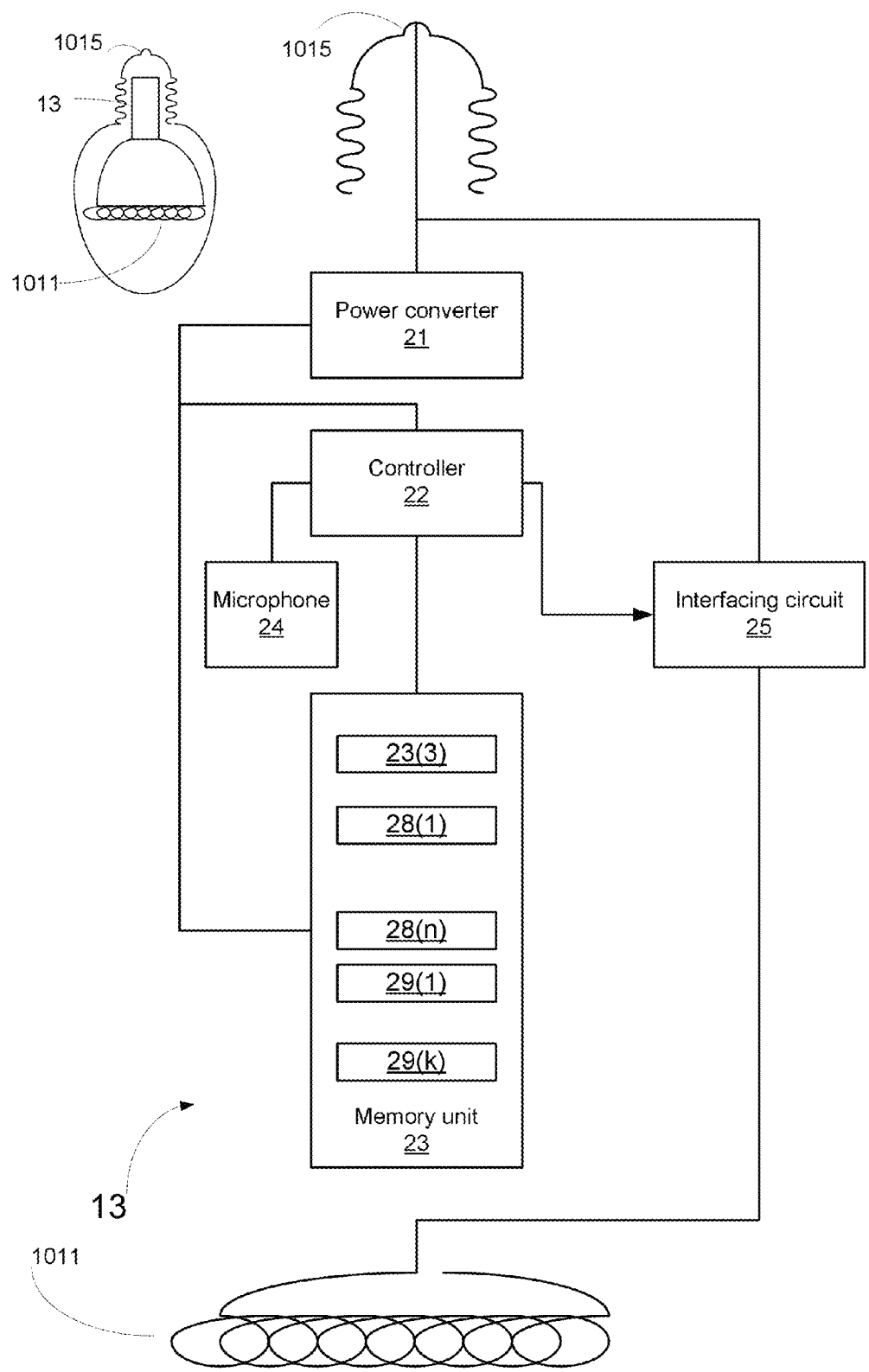
FIG. 10 illustrates a bulb according to an embodiment of the invention.

According to an embodiment of the invention there may be provided a bulb that includes the circuitry disclosed in the specification. Referring to FIG. 10, there may be provided a bulb 1000 that includes circuitry 13, located within the bulb, that is electrically coupled between the bulb base 1015 and the bulb light source 1011 and is arranged to control a provision of electricity from the bulb base to the bulb light source in response to a reception of sound waves are associated with a command to be executed by the circuitry.

For example, the circuitry may include a controller and an interfacing circuit; wherein the controller is coupled to the microphone and to the interfacing circuit; wherein the interfacing circuit is coupled to the bulb base and to the bulb light source; wherein the microphone is arranged to sense sound signals; wherein the interfacing circuit is arranged to selectively provide the electricity from the bulb base to the light source under the control of the controller; and wherein the controller is arranged to control the interfacing circuit in response to at least a detection of sound signals that represent a command. The circuitry may include a power converter for receiving electricity supplied from the bulb base (or any other bulb input port) and outputting a controller power supply.

The circuitry may include a memory unit for storing representations of multiple commands; wherein the controller is arranged to compare sound signals to the representations of the multiple commands.

Method

According to an embodiment of the invention the user may be allowed to set the mapping between sound signals and commands. For each command there may be a sound trigger that triggers the execution of the command. The mapping is indicative of commands and their triggers—the sound signals that trigger the commands. Thus—the user may determine which sound signals will set each command. The bulb adaptor can be provided with a default mapping (default sound signals that will trigger different commands). The user may use the default mapping but may also provide his own customized mappings (his customized triggers).

A user device (such as a smartphone) may execute an application that will cause the smartphone to communicate with the bulb adaptor and to change the mapping between sound signals and commands. The communication may start by sending a request to change the mapping. The request can be have the form of predetermined sound signals. The request can include predetermined sound signals that were programmed to the bulb adaptor as representing a request to change the mapping.

Once the request is received by the by bulb adaptor—the bulb adaptor can participate in a mapping change process in which the user may define the required trigger. One or more mappings (triggers) can be defined during a single mapping change process.

Figure 11:
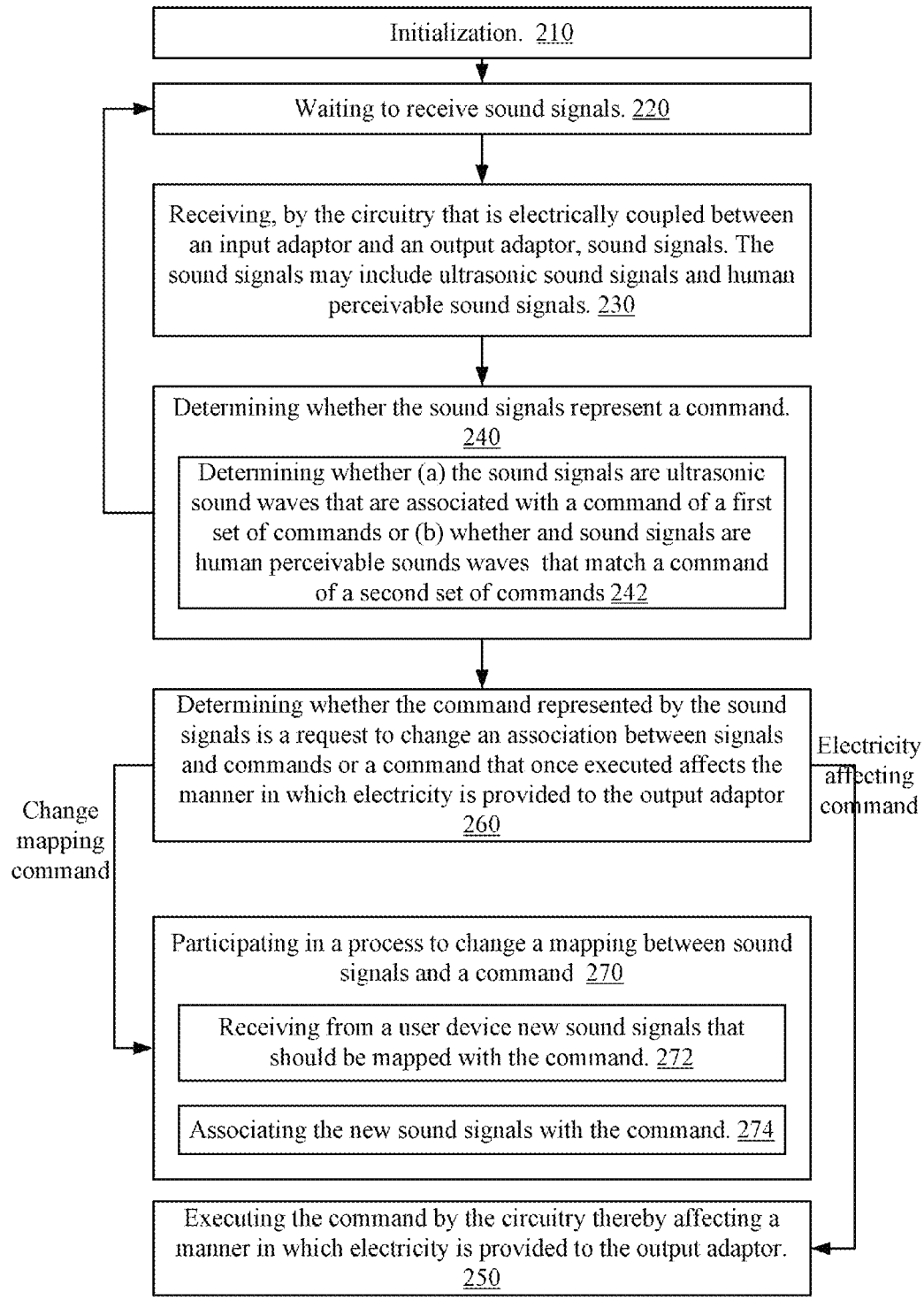
FIG. 11 illustrates a method according to an embodiment of the invention.

FIG. 11 illustrates method 201 according to an embodiment of the invention.

The method may start by stage 210 of initialization. The initialization may include configuring the bulb adaptor—for example sending one or more configurations command to a circuitry. This may include assigning a bulb adaptor identifier to the bulb adaptor, sending a set of instructions to be included in the first and/or second sets of commands.

Stage 210 may be followed by stage 220 of waiting to receive sound signals.

Stage 220 is followed by stage 230 of receiving, by the circuitry that is electrically coupled between an input adaptor and an output adaptor, sound signals. The sound signals may include ultrasonic sound signals and human perceivable sound signals.

Stage 230 may be followed by stage 240 of determining whether the sound signals represent a command.

Stage 240 may include determining whether (a) the sound signals are ultrasonic sound waves that are associated with a command of a first set of commands or (b) whether and sound signals are human perceivable sounds waves that match a command of a second set of commands.

If both (a) and (b) fail (no match to any command of the first and second sets of commands) then stage 240 is followed by stage 220.

If yes—jumping to stage 260 of determining whether the command represented by the sound signals is a request to change an association between signals and commands (a change mapping command) or a command (electricity affecting command) that once executed affects the manner in which electricity is provided to the output adaptor.

If the command is an electricity affecting command then stage 260 is followed by stage 250 of executing the command by the circuitry thereby affecting a manner in which electricity is provided to the output adaptor.

If the command is a change mapping command then stage 260 is followed by stage 270 of participating in a process to change a mapping between sound signals and a command.

Stage 270 may include stage 272 of receiving from a user device new sound signals that should be mapped with the command.

Stage 270 may include stage 274 of associating the new sound signals with the command. This may include storing the new trigger (new mapping) in a non-volatile memory of the bulb adaptor.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A bulb adaptor, comprising:
    a housing that comprises an input adaptor and an output adaptor; wherein the input adaptor is shaped and sized to match a bulb socket and wherein the output adaptor is shaped and sized to match a base of a bulb; and
    circuitry, located within the housing, that is electrically coupled between the input adaptor and the output adaptor;
    wherein the circuitry is arranged to
    (a) search for ultrasonic sound waves that represent a command of a first set of commands and to search for human perceptible sound waves that represent a command of a second set of command; wherein the second set of commands consists of commands that consist of a bulb adaptor identifier and up to two additional words;
    (b) ignore any command of the second set of commands that does not comprise a bulb adaptor identifier that matches a bulb adaptor identifier associated with the bulb adaptor; and
    (c) control a provision of electricity from the input adaptor to the output adaptor in response to a reception of a command of the first set of commands and in response to a reception of a command of the second set of commands that comprises the bulb adaptor identifier that matches the bulb adaptor identifier associated with the bulb adaptor.

2. The bulb adaptor according to claim 1 wherein the first set of commands equals the second set of command.

3. The bulb adaptor according to claim 1 wherein the first set of commands differs from the second set of commands.

4. The bulb adaptor according to claim 1 wherein the first set of commands comprises more commands than the second set of commands.

5. The bulb adaptor according to claim 1 wherein the first set of commands comprises at least one command that is more complex than each command of the second set of commands.

6. The bulb adaptor according to claim 1 wherein the first set of commands comprises at least one command that lacks a bulb identifier and wherein the circuitry is arranged to respond to the at least one command that lacks the bulb identifier.

7. The bulb adaptor according to claim 1 wherein the second set of commands consists of a turn on command and a turn off command.

8. The bulb adaptor according to claim 1 wherein the first set of commands comprises a turn on command, a turn off command, at least one time related command, and a dimmer command.

9. The blub adaptor according to claim 1 wherein the first set of commands comprises a circuit configuration command.

10. The bulb adaptor according to claim 1 wherein the circuitry is arranged to apply a signature seeking process on ultrasonic sound waves received by the circuitry to search for one or more command.

11. The bulb adaptor according to claim 1 wherein the circuitry is arranged to apply a speech recognition process to human perceptible sound waves to detect one or more command.

12. The bulb adaptor according to claim 1 wherein the circuitry comprises: a microphone; a controller; an interfacing circuit; wherein the controller is coupled to the microphone and to the interfacing circuit; wherein the interfacing circuit is coupled to the input and output adaptors; wherein the microphone is arranged to sense sound signals; wherein the interfacing circuit is arranged to selectively provide the electricity from the input adaptor to the output adaptor under the control of the controller; and wherein the controller is arranged to control the interfacing circuit.

13. The bulb adaptor according to claim 12 wherein the circuitry comprises a power converter for receiving electricity supplied from the input adaptor and outputting a controller power supply.

14. The bulb adaptor according to claim 12 comprising a memory unit for storing representations of multiple commands; wherein the controller is arranged to compare sound signals to the representations of the multiple commands.

15. The bulb adaptor according to claim 1 wherein the input adaptor differs by diameter from the output adaptor.

16. The bulb adaptor according to claim 1 wherein the housing exhibits a radial symmetry.

17. The bulb adaptor according to claim 1 wherein the input adaptor and the output adaptor are Edison adaptors.

18. The bulb adaptor according to claim 1 wherein the input adaptor and the output adaptor are Edison E-27 adaptors.

19. The blub adaptor according to claim 1 wherein the circuitry is arranged to participate in a process of changing a mapping between sound signals and a command to be executed by the circuitry.

20. The bulb adaptor according to claim 19 wherein the circuitry is arranged to determine whether a command represented by sound signals received by the circuitry is a request to change an association between signals and commands or a command that once executed by the circuitry affects the manner in which electricity is provided to the output adaptor.

21. A bulb adaptor, comprising: a housing that comprises an input adaptor and an output adaptor; wherein the input adaptor is shaped and sized to match a bulb socket and wherein the output adaptor is shaped and sized to match a base of a bulb; and circuitry, located within the housing, that is electrically coupled between the input adaptor and the output adaptor and is arranged to (a) control a provision of electricity from the input adaptor to the output adaptor in response to a reception of sound waves are associated with a command to be executed by the circuitry; (b) participate in a process of changing a mapping between sound signals and a command to be executed by the circuitry; and
    wherein one of the following is true:
    (i) the circuitry is further arranged to search for a request to change the mapping and when detecting a request, allowing a user to provide new sound signals associated with the command; and
    (ii) the circuitry is further arranged to determine whether a command represented by sound signals received by the circuitry is a request to change an association between signals and commands or a command that once executed by the circuitry affects the manner in which electricity is provided to the output adaptor.

22. A method for controlling a provision of electricity to a blub, the method comprises:
    receiving, by circuitry that is electrically coupled between an input adaptor and an output adaptor, sound signals;

searching, by the circuitry, for ultrasonic sound waves that represent a command of a first set of commands and to search for human perceptible sound waves that represent a command of a second set of command; wherein the second set of commands consists of commands that consist of a bulb adaptor identifier and up to two additional words;

ignoring, by the circuitry, any command of the second set of commands that does not comprise a bulb adaptor identifier that matches a bulb adaptor identifier associated with the bulb adaptor; and controlling, by the circuitry, a provision of electricity from the input adaptor to the output adaptor in response to a reception of a command of the first set of commands and in response to a reception of a command of the second set of commands that comprises the bulb adaptor identifier that matches the bulb adaptor identifier associated with the bulb adaptor;

wherein the circuitry is at least partially surrounded by a housing that comprises the input adaptor and the output adaptor; wherein the input adaptor is shaped and sized to match a bulb socket and wherein the output adaptor is shaped and sized to match a base of a bulb.

23. The method according to claim 22 comprising determining whether a command represented by sound signals received by the circuitry is a request to change an association between signals and commands or a command that once executed by the circuitry affects the manner in which electricity is provided to the output adaptor.

24. A bulb, comprising: a bulb base for receiving electricity, a bulb light source for outputting light; and circuitry that is electrically coupled between the bulb base and the bulb light source; (a) search for ultrasonic sound waves that represent a command of a first set of commands and to search for human perceptible sound waves that represent a command of a second set of command; wherein the second set of commands consists of commands that consist of a bulb identifier and up to two additional words;

(b) ignore any command of the second set of commands that does not comprise a bulb identifier that matches a bulb identifier associated with the bulb; and (c) control a provision of electricity from the input adaptor to the output adaptor in response to a reception of a command of the first set of commands and in response to a reception of a command of the second set of commands that comprises the bulb identifier that matches the bulb identifier associated with the bulb.

25. The bulb according to claim 24 wherein the circuitry comprises a controller, a microphone and an interfacing circuit; wherein the controller is coupled to the microphone and to the interfacing circuit; wherein the interfacing circuit is coupled to the bulb base and to the bulb light source; wherein the microphone is arranged to sense sound signals; wherein the interfacing circuit is arranged to selectively provide electricity from the bulb base to the bulb light source under the control of the controller; and wherein the controller is arranged to control the interfacing circuit in response to at least a detection of sound signals that represent a command.

26. A method for controlling a provision of electricity to a blub light source, the method comprises:

receiving, by circuitry of a blub that is electrically coupled between a blub base and the bulb light source, sound signals;

determining whether the sound signals represent a command;

controlling, by the circuitry, a provision of electricity from the bulb base to the bulb light source in response to a detection of the command;

participating in a process of changing a mapping between sound signals and a command to be executed by the circuitry; and wherein one of the following is true:

(i) the method further comprise searching for a request to change the mapping and when detecting a request, allowing a user to provide new sound signals associated with the command; and (ii) the method further comprises determining whether a command represented by sound signals received by the circuitry is a request to change an association between signals and commands or a command that once executed by the circuitry affects the manner in which electricity is provided to the output adaptor.

27. A bulb, comprising: a bulb base for receiving electricity, a bulb light source for outputting light; and circuitry that is electrically coupled between the bulb base and the bulb light source and is arranged to (a) control a provision of electricity from the bulb base to the bulb light source in response to a reception of sound waves are associated with a command to be executed by the circuitry; (b) participate in a process of changing a mapping between sound signals and a command to be executed by the circuitry;

wherein one of the following is true:

(i) the circuitry is further arranged to search for a request to change the mapping and when detecting a request, allowing a user to provide new sound signals associated with the command; and (ii) the circuitry is further arranged to determine whether a command represented by sound signals received by the circuitry is a request to change an association between signals and commands or a command that once executed by the circuitry affects the manner in which electricity is provided to the output adaptor.

* * * * *